(12) United States Patent
Broehl et al.

(10) Patent No.: US 9,737,952 B2
(45) Date of Patent: Aug. 22, 2017

(54) JOINING METHOD AND JOINING APPLIANCE

(71) Applicants: Reinhold Broehl, Giessen (DE); Michael Giesel, Giessen (DE); Uwe Hett, Giessen (DE); Markus Isenberg, Giessen (DE); Udo Schulz, Giessen (DE); Rolf-Dieter Graf, Giessen (DE)

(72) Inventors: Reinhold Broehl, Giessen (DE); Michael Giesel, Giessen (DE); Uwe Hett, Giessen (DE); Markus Isenberg, Giessen (DE); Udo Schulz, Giessen (DE); Rolf-Dieter Graf, Giessen (DE)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 13/632,626

(22) Filed: Oct. 1, 2012

(65) Prior Publication Data

US 2013/0037199 A1 Feb. 14, 2013

Related U.S. Application Data

(63) Continuation of application No. PCT/EP2011/051506, filed on Feb. 3, 2011.

(30) Foreign Application Priority Data

Apr. 1, 2010 (DE) ........................ 10 2010 013 913

(51) Int. Cl.
| | | |
|---|---|---|
| *B32B 41/00* | (2006.01) | |
| *B23K 9/20* | (2006.01) | |
| *B23K 11/00* | (2006.01) | |
| *B23K 11/14* | (2006.01) | |

(52) U.S. Cl.
CPC .............. *B23K 9/201* (2013.01); *B23K 9/206* (2013.01); *B23K 11/0053* (2013.01); *B23K 11/14* (2013.01)

(58) Field of Classification Search
CPC ........... B23K 9/20; B25J 15/0206; G01B 7/14
USPC .... 156/64, 350, 351, 360, 378, 379; 219/98, 219/99, 130.1; 29/705, 714
See application file for complete search history.

(56) References Cited

U.S. PATENT DOCUMENTS

| | | | |
|---|---|---|---|
| 5,502,291 A | 3/1996 | Cummings | |
| 2004/0056005 A1* | 3/2004 | Willershausen | ................ 219/98 |
| 2006/0238189 A1 | 10/2006 | Holcomb et al. | |
| 2007/0067975 A1* | 3/2007 | Gerhardt et al. | ............ 29/407.1 |

FOREIGN PATENT DOCUMENTS

| | | |
|---|---|---|
| CN | 101032779 A | 9/2007 |
| DE | 3900491 A | 12/1990 |
| WO | 0176800 A | 10/2001 |

* cited by examiner

*Primary Examiner* — Michael N Orlando
*Assistant Examiner* — Joshel Rivera
(74) *Attorney, Agent, or Firm* — Michael P. Leary

(57) ABSTRACT

A method for joining studs to workpieces, in particular for the purpose of stud welding, comprising the steps of acquiring a distinguishing dimension of a stud to be joined by the application of a sensing element to the stud and through measurement of a travel distance of the sensing element as it is applied to the stud; and then joining the stud to a workpiece, if the dimension of the stud is within an allowable tolerance range, and the allowable tolerance range is adapted in dependence on the travel distance of the sensing element measured during a preceding method step.

20 Claims, 2 Drawing Sheets

JOINING METHOD AND JOINING APPLIANCE

CROSS-REFERENCE TO RELATED APPLICATION

This application is a continuation of PCT/EP2011/051506, filed Feb. 3, 2011 which claims priority from German Patent Application No. DE 102010013913.0, filed on Apr. 1, 2010, the disclosure of which is incorporated herein by reference.

BACKGROUND OF THE INVENTION

The present invention relates to a method for joining studs to workpieces, in particular for the purpose of stud welding, and to a joining appliance for executing such a method.

Various methods for joining fastening elements, such as studs, to a workpiece, such as a plate, are known in the prior art. There is known, for example, the practice of adhesive-bonding or thermoplastically welding fastening elements to component parts. Further, so-called stud welding is an established process for welding metallic fastening elements to metallic workpieces.

These types of joining method are used extensively in the automobile industry, for example, wherein studs are joined to workpieces such as vehicle-body plates or other vehicle-body portions. The studs then frequently serve as anchors for fastening mount-on parts or for clipping-on plastic clips to which, in turn, other component parts can be fixed, such as electrical lines, brake hoses, etc.

In industrial application, these types of joining method are usually automated, a joining head usually being guided in an automated manner by a robot. Further, there is known the practice of automated feeding of the studs to the joining head, for example by means of compressed air. In the joining head, the studs are then usually each held singly by a holding device or a gripper, before they are joined to the workpiece.

Known in this case is the practice of acquiring a dimension of a stud to be joined, before the actual joining operation, through application of a sensing element to the stud and through acquisition of a travel distance of the sensing element required for this purpose. It can thereby be ensured, for example, that studs of the correct shank diameter are joined. In the case of the sequential processing of studs of differing dimensions, in particular, such a measuring operation before the actual joining operation is of particular importance. In the event of an incorrect stud being erroneously present in the joining head, it can still be removed before the actual joining operation is performed. Elaborate repair works can thereby be avoided. In this case, the dimension of the stud is generally compared with an allowable tolerance range.

BRIEF SUMMARY OF THE APPLICATION

Against this background, it is an object of the invention to specify an improved method for joining studs to workpieces, in particular for the purpose of stud welding, and to provide an associated joining appliance.

The above object is achieved by a method for joining studs to workpieces, in particular for the purpose of stud welding, comprising the steps of:

acquiring at least one dimension of a stud to be joined, through application of a sensing element to the stud and through acquisition of a travel distance of the sensing element required for this purpose; and joining the stud to a workpiece, if the dimension of the stud is within an allowable tolerance range, the allowable tolerance range being adapted in dependence on the travel distance of the sensing element in the case of at least one preceding method step.

Further, the above object is achieved through an appliance for executing such a method.

It has been shown that, in execution of a multiplicity of joining operations, the acquisition of the dimension of the stud to be joined is rendered difficult in that either the sensing element becomes abraded with time, or deposits accumulate thereon. Consequently, in the prior art, it is necessary either to replace the sensing element at cyclic intervals or, alternatively, manually to recalibrate the allowable tolerance range in order to compensate the change in the length of the sensing element. In the case of the manual calibration operation, manual intervention becomes necessary, in the case of successive joining operations, for example, when one or more studs are outside of the tolerance range. In the case of this manual intervention, the variation of the sensing element is then measured, for example, on the basis of a supplied stud, and the tolerance range is reset manually.

The present invention, by contrast, renders possible an automatic adaptation of the allowable tolerance range, this being in dependence on the travel distance of the sensing element in the case of at least one preceding method step. This can either be effected in the case of each joining operation or, alternatively, cyclically, after a defined number of joining operations. It thereby becomes possible for the creeping change in the length of the sensing element (whether due to abrasion or deposits) to be corrected continuously during operation.

Whereas, in the prior art, recalibration of the tolerance range is effected whenever one or more studs are outside of the originally set tolerance range, according to the invention the tolerance range is adapted automatically to the change in the length of the sensing element. Manual interventions can therefore usually be avoided, up to a point in time at which the sensing element must be replaced completely. Consequently, there is absolutely no need, or at least there is no longer such a frequent need, for manual intervention in order to recalibrate the sensing element for the purpose of compensating the wear on the sensing element.

The dimension of the stud can be a diameter, such as a shank diameter or a flange diameter of a stud. However, the dimension of the stud to be joined can also be a length such as, for example, a shank length, a stud length or a flange length.

In the present case, the term joining is to be understood in a wide sense, and comprises both stud welding and methods for adhesive-bonding of studs to workpieces and methods for thermoplastic welding of studs to workpieces. Consequently, both the studs and the workpieces can be made of any materials such as, for example, metal, plastic, composite materials, etc.

Also, in the present case, the term stud is to be understood in a wide sense, and comprises both rotationally symmetrical component parts and irregularly shaped component parts, such as plate pieces that are joined at an end face to a workpiece ("Weldfast"®).

The allowable tolerance range can be matched to the respective application, and can be relatively wide. However, the tolerance range can also be relatively narrow, and in extreme cases can be a single, defined value.

In order to prevent the joining of non-fitting studs, the acquisition of the at least one dimension of a stud to be joined is preferably effected before a respective joining operation. Generally, however, it is also possible for such an acquisition operation to be performed after the joining operation.

The travel distance of the sensing element that is used for determining the dimension of the stud can be acquired either directly or, also, indirectly, for example through an angle of movement of the sensing element, through the speed of the sensing element, etc.

The allowable tolerance range can be an individual setpoint value, which is adapted in dependence on the travel distance of the sensing element in the case of at least one preceding joining operation. In this case, it is possible for a tolerance region to be adapted indirectly, in that the tolerance region is coupled to the setpoint value for the necessary travel distance. The tolerance range can thus also be adapted automatically.

Overall, it is possible to dispense with cyclic, manual calibration of the sensing element. The periods between interventions by the plant personnel can be extended. Disruptions are minimized, in that incorrect stud diameters are detected at an early stage. This is because the setpoint value, or the allowable tolerance range, is adapted to the wear on the sensing element.

The above object is thereby achieved in full.

According to a particularly preferred embodiment, the travel distances of the sensing element are acquired during application to a stud to be joined, in the case of at least one preceding joining operation, for the purpose of adaptation of the allowable tolerance range.

In the case of this embodiment, automatic adaptation of the tolerance range in dependence on the stud dimension of at least one preceding joining operation is preferably effected in the case of each joining operation or, alternatively, cyclically.

In the case of this embodiment, the automatic adaptation of the tolerance range can be effected without any structural change to the joining tool. The method according to the invention can be realized by means of software.

It is particularly advantageous if the allowable tolerance range is adapted in dependence on the travel distances of the sensing element in the case of a plurality of preceding joining operations.

The adaptation of the tolerance range can thereby be effected with greater accuracy. In particular, it is possible to equalize certain dimensional variations. This can be effected, for example, through appropriate filtering of the preceding measurement values of the travel distances. It is also possible in this case for more recent measurement values to be given a greater weighting than older measurement values.

It is particularly preferable if the allowable tolerance range is adapted in dependence on a sliding mean value of the travel distances of the sensing element in the case of the plurality of preceding joining operations. A relatively accurate adaptation of the tolerance range can be effected without need for a high computing capacity.

In the case of a sufficiently high number of preceding joining operations being included in the formation of the sliding mean value, the adaptation of the allowable tolerance range can be effected even if the dimension, for example of one of the plurality of joined studs, was outside of the allowable tolerance band.

Preferably, however, the formation of the sliding mean value is effected on the basis of a relatively small number of preceding joining operations, for example fewer than 10. It is preferred, in particular, if the adaptation of the allowable tolerance range is effected only if the dimension of the stud in the preceding joining operation was within the allowable tolerance band.

This prevents the dimensions of incorrect studs from being included in the adaptation of the tolerance range.

According to a further preferred embodiment, for the purpose of adaptation of the additional tolerance range the travel distance of the sensing element is acquired during application to a reference mandrel.

Such an adaptation operation can be effected, for example, cyclically, in such a way that the tolerance range is always adapted at a sufficiently early stage, before there is a risk of a correct stud falling out of the tolerance range. For example, such an adaptation operation can be performed after a number of joining operations, which number is less than 10,000, in particular less than 5,000, in particular less than 2,000. The reference mandrel can be a specially produced standard part or, alternatively, a "normal" stud.

Further, it is advantageous overall if the stud is gripped by a mechanical gripper before being joined to the workpiece.

It is particularly advantageous in this case if the gripper has at least one gripper arm, which constitutes the sensing element.

This enables the method to be performed with a small amount of structural resource.

It is understood that the above mentioned features and those to be explained in the following can be applied, not only in the respectively specified combination, but also in other combinations or singly, without departure from the scope of the present invention.

BRIEF DESCRIPTION OF THE SEVERAL VIEWS OF THE DRAWINGS

Exemplary embodiments of the invention are represented in the drawing and described more fully in the following description. In the drawing.

DETAILED DESCRIPTION OF THE PREFERRED EMBODIMENTS

Figure 1:
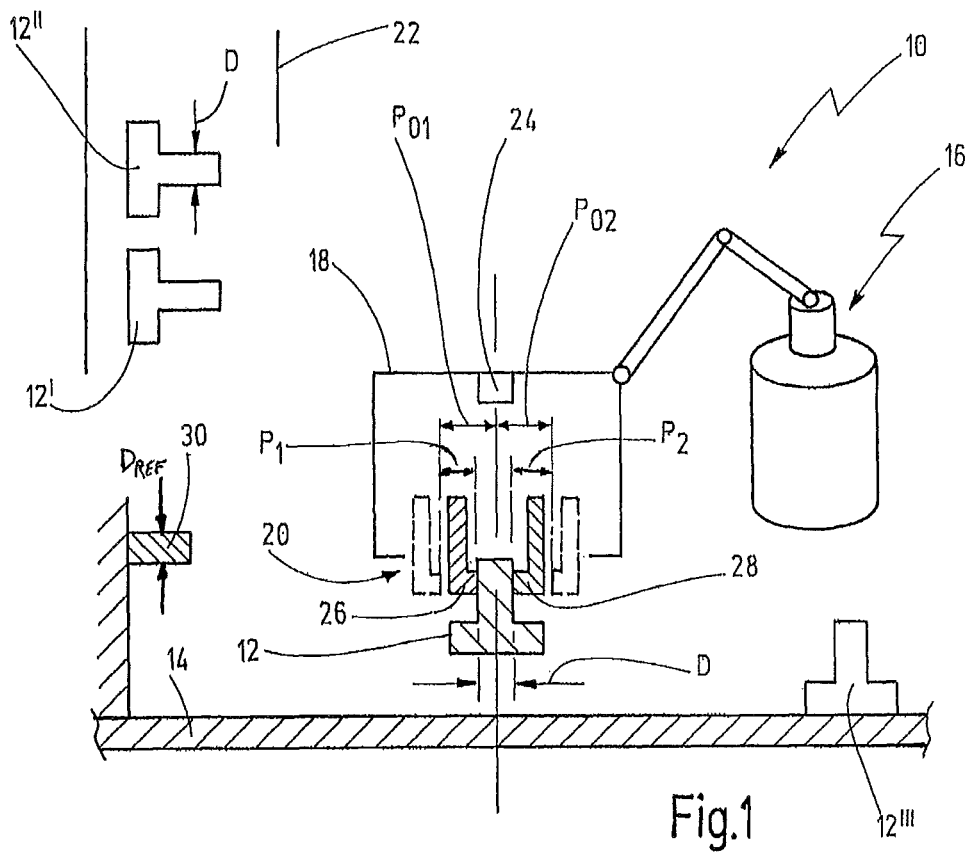
FIG. 1 shows a schematic representation of a joining appliance according to the invention.

In FIG. 1, a joining appliance is denoted in general by 10. The joining appliance 10 serves to join studs 12 to workpieces 14, for example through stud welding, stud adhesive-bonding, etc. The joining appliance 10 has a robot 16, on the arm of which there is arranged a joining head 18. Arranged on the joining head 18 is a gripper 20, for gripping one stud in each case. Further, the joining appliance 10 comprises a magazine 22, in which studs 12', 12" that are subsequently to be joined are made available. It is further shown in FIG. 1 that a stud 12''' has already been joined to the workpiece 14. After the stud 12 held by the gripper 20 in FIG. 1 has been joined to the workpiece 14, the joining head 18 can be moved, by means of the robot 16, towards the magazine 22, in order to grip a further stud 12' by means of the gripper 20 and thereby supply it to a further joining operation. A stud, denoted by 12" in FIG. 1, is then joined.

In the present case, the studs 12 are represented schematically as flanged studs, which have distinguishing dimension D, for example a shank diameter.

In the case of the appliance represented in FIG. 1, it is provided that, before a joining operation, this shank diameter D is measured in order to determine whether the stud 12 held by the gripper 20 is the correct stud type for the joining operation to follow.

It is understood, however, that means can also be provided in the joining head in order to measure other distinguishing dimensions, as an alternative or in addition thereto, the flange diameter, the stud length, the shank length or other dimensions of the stud.

The distinguishing dimension of the stud, in the present case the shank diameter D, is measured in that a sensing element is applied to the stud and in that the travel distance of the sensing element required for this purpose is acquired. In the present case, the acquisition of the dimension is effected by means of a displacement sensor 24, which is represented schematically in FIG. 1 and which is designed to acquire the travel distances of a first gripper arm 26 and a second gripper arm 28 of the gripper 20.

Thus, FIG. 1 shows that the first and the second gripper arm 26, 28, before gripping a stud 12, are in a zero position (shown in broken lines), denoted in FIG. 1 by $P_{01}$ and $P_{02}$, respectively. For the purpose of gripping the stud 12, the gripper arms 26, 28 are moved towards one another, wherein they travel a first and a second travel distance $P_1$ and $P_2$, respectively.

As soon as the gripper arms 26, 28 bear on the shank of the stud 12, its diameter D can be calculated by means of the formula $D=(P_{01}-P_1)+(P_{02}-P_2)$.

This manner of calculating the dimension of the stud is to be understood as being merely an example. It is conceivable, in other embodiments, for gripper elements to move rotationally onto the stud, such that a rotational angle of the gripper arms is acquired. It is also conceivable for one of the gripper arms to be held rigid, and only a second gripper arm to be moved onto the rigid gripper arm. It is also possible to provide more than two gripper arms. In the present case, the diameter D of the stud shank is calculated through measurement of the travel distances of the gripper arms 26, 28. Alternatively, however, it is also possible for the acquisition of the dimension of a stud to be joined to be performed by a measuring device that is realized so as to be separate from the gripper 20. Such a separate measuring device can be arranged on the joining head 18, but can also be arranged in the region of the magazine 22.

During operation of the joining appliance 10, wear occurs on the bearing contact surfaces of the gripper arms 26, 28. Usually, this is a certain amount of abrasion, but could also be a deposit of materials.

As a result, for by example of the abrasion of the gripper arms 26, 28, there arises the situation whereby, after a first calibration, the measured shank thickness D becomes ever smaller, since the travel distances $P_1$, $P_2$ to be traveled by the gripper arms 26, 28 becomes ever greater.

Figure 3:
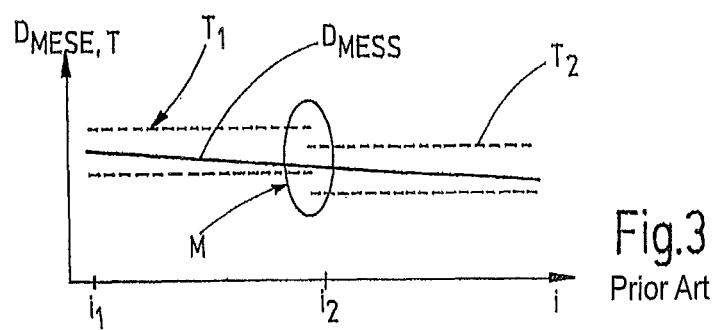
FIG. 3 shows a representation comparable to that of FIG. 2, wherein the tolerance range is redefined through a manual intervention according to the prior art method.

FIG. 3 shows an example wherein, in the case of an initial calibration operation at first instant $i_1$, a measurement value $D_{MESS}$ is determined as being in accordance with an actual shank diameter, and wherein a tolerance range $T_1$ is defined around this calibrated value of $D_{MESS}$. With the performance of a plurality of joining operations and the consequential abrasion of the gripper arms 26, 28, the value of $D_{MESS}$ reduces more and more, until finally it reaches the edge of the tolerance range $T_1$. A manual intervention operation M is used to recalibrate the measuring system, such that, at an instant $i_2$, a new value of $D_{MESS}$ is defined as a correct measurement value and, accordingly, a new allowable tolerance range $T_2$ is defined.

Figure 2:
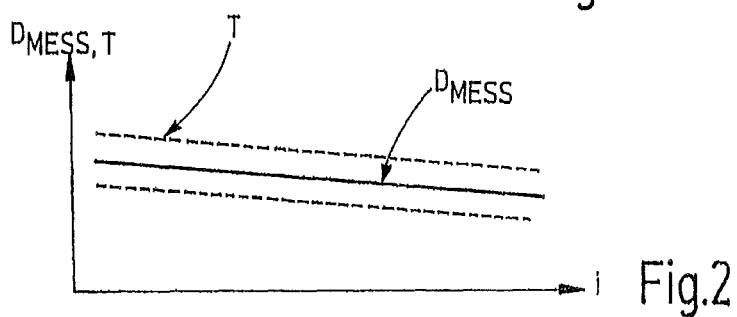
FIG. 2 shows a representation of a measured stud diameter and of an associated allowable tolerance range, as obtained over time, or over the number of joining operations performed, in the performance of the method according to the invention.

FIG. 2 shows that the allowable tolerance range T can be adapted automatically, during operation, to the abrasion of the gripper arms 26, 28. This can be effected, for example, in that the allowable tolerance range is adapted in dependence on a sliding mean value of the travel distances $P_1$, $P_2$ of the gripper arms 26, 28 in the case of a plurality of preceding joining operations. Consequently, there is no need for the cyclic, manual recalibration M of the acquisition system. This enables the intervals of intervention by the plant personnel to be extended. Further, it is possible to minimize disruptions, which can occur as a result of incorrect stud diameters being identified. This is because the setpoint value, and the therewith associated allowable tolerance range T, are adapted to the wear on the gripper arms 26, 28.

In the present case, for the allowable tolerance range T in FIG. 2 a linear drop is obtained, which corresponds to a linear wear. If the wear is non-linear, the allowable tolerance range, correspondingly, will also be adapted in a non-linear manner.

Figure 4:
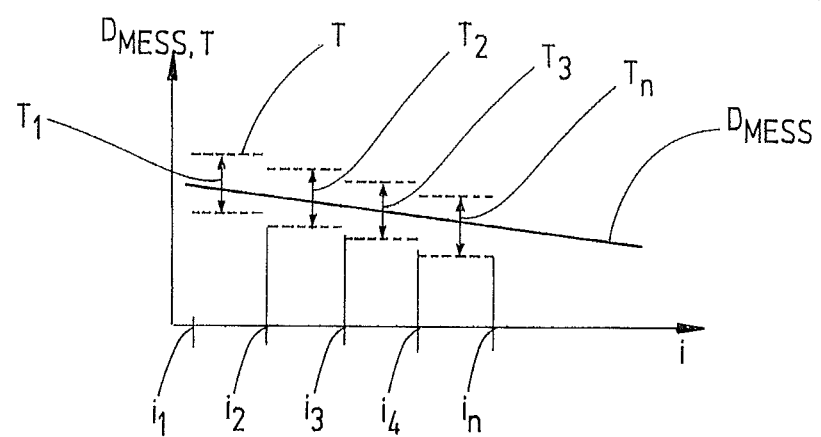
FIG. 4 shows a representation comparable to that of FIG. 2, wherein the tolerance range is effected through automatic calibration on a reference mandrel.

A further embodiment of a method according to the invention is shown in FIG. 4. In the case of this method, a reference stud shank or mandrel 30 defining a reference dimension $D_{REF}$, as represented in FIG. 1, is used for the automatic adaptation of the tolerance range T. The reference mandrel 30 is located in the gripper region of the joining head 18, and can be approached by the joining head 18, between two joining operations, in order to perform an automatic recalibration by means of the gripper arms 26, 28. The diameter of the reference mandrel 30 is the standard diameter D of a stud 12.

FIG. 4 shows that, at an instant $i_1$, for example before a first joining operation, calibration on the basis of the reference mandrel 30 is effected with new gripper arms 26, 28, and a first tolerance range $T_1$ is then set.

At a second instant $i_2$, which, expectedly, is significantly before an instant at which the value of $D_{MESS}$ falls out of the first tolerance range $T_1$ owing to the wear on the gripper arms 26, 28, a second measuring step is effected automatically, through use of a reference mandrel 30. Owing to the abrasion of the gripper arms 26, 28 that has occurred in the interim, there is a displacement of the tolerance range, as shown at $T_2$. After a defined number of joining operations (the number being, for example, <10,000, in particular <5,000, and particularly preferably <2,000), there is again an automatic operation to adapt the tolerance range through use of the reference mandrel 30 (at $i_3$, . . . ).

In the case of this embodiment, owing to the use of a precise reference stud 30, there is no need to form a sliding mean value for the purpose of automatic adaptation of the tolerance range. The structural resource requirement for setting up such an automatic tolerance adaptation method is comparatively small, and consists, substantially, in a software adaptation and in the provision of a reference stud 30 in the gripper region of the joining head 18.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method for joining studs to workpieces, in particular for the purpose of stud welding, comprising the steps of:
    acquiring a distinguishing dimension of a stud to be joined, through application of a sensing element to the stud and through measurement of a travel distance of the sensing element required for this purpose, wherein the travel distance is related to the distinguishing dimension and the distinguishing dimension is related to an allowable tolerance range;
    rejecting the stud if the distinguishing dimension of the stud is outside of the allowable tolerance range; and
    joining the stud to a workpiece, if the distinguishing dimension of the stud is within the allowable tolerance range, and
wherein the allowable tolerance range is later automatically adapted in dependence on the travel distance of the sensing element measured during the joining operation of the stud to compensate for a physical change to the sensing element that results in a relationship change between the travel distance and the distinguishing dimension; and wherein the later automatically adapted allowable tolerance range is used as the allowable tolerance range in a subsequent joining operation.

2. The method of claim 1, wherein, for the purpose of adaptation of the allowable tolerance range the travel distance of the sensing element is measured during application to the stud joined during a single preceding joining operation.

3. The method of claim 1, wherein, the allowable tolerance range is adapted in dependence on the travel distances of the sensing element measured during a plurality of preceding joining operations.

4. The method of claim 3, wherein the allowable tolerance range is adapted in dependence on a sliding mean value of the travel distances of the sensing element measured during the plurality of preceding joining operations.

5. The method of claim 1, wherein the allowable tolerance range is adapted in dependence on the travel distance of the sensing element measured during application of the sensing element to a reference stud.

6. The method of claim 1, wherein the stud is gripped by a mechanical gripper before being joined to the workpiece.

7. The method as claimed in claim 6, wherein the gripper includes a movable gripper arm, and the sensing element includes the gripper arm.

8. A method for welding studs to a workpiece, the method comprising the steps of:
    determining a first distinguishing dimension of a first stud through measurement of a first travel distance of a sensing element applied to the first stud, wherein the first travel distance is related to the first distinguishing dimension;
    comparing the first distinguishing dimension of the first stud to a first allowable tolerance range, wherein the first distinguishing dimension is related to the first allowable tolerance range;
    rejecting the first stud, if the first distinguishing dimension of the first stud is outside of the first allowable tolerance range;
    joining the first stud to a workpiece, if the first distinguishing dimension of the first stud is within the first allowable tolerance range, and
    automatically adapting the first allowable tolerance range to create a second allowable tolerance range in dependence on the first travel distance of the sensing element to compensate for a physical change to the sensing element that results in a relationship change between the travel distance and the distinguishing dimension;
    determining a second distinguishing dimension of a second stud through measurement of a second travel distance of the sensing element applied to the second stud; and
    comparing the second distinguishing dimension of the second stud to the second allowable tolerance range.

9. The method of welding according to claim 8, wherein the first travel distance is one of a plurality of preceding measured travel distances, and in the step of adapting the first allowable tolerance range the second allowable tolerance range is created by adapting the first allowable tolerance range in dependence on the plurality of preceding measured travel distances.

10. The method of welding according to claim 9, wherein the first allowable tolerance range is adapted in dependence on a sliding mean value of the plurality of preceding measured travel distances.

11. The method of claim 1, wherein the tolerance range is later automatically adapted by at least one of:
    recentering the tolerance range; and
    changing at least one of an upper limit and a lower limit of the tolerance range.

12. The method of claim 1, wherein the tolerance range is later automatically adapted by recentering the tolerance range on the distinguishing dimension of the stud as measured by the travel distance of the sensing element.

13. The method of claim 4, wherein the allowable tolerance range is later automatically adapted by recentering of the tolerance range on a distinguishing dimension calculated on a sliding mean value of the travel distances of the sensing element measured during the plurality of preceding joining operations.

14. The method of claim 8, wherein the step of automatically adapting the first allowable tolerance range to create a second allowable tolerance range comprises at least one of:
    recentering the first allowable tolerance range; and
    changing at least one of an upper limit and a lower limit of the first allowable tolerance range.

15. The method of claim 8, wherein step of automatically adapting the first allowable tolerance range to create a second allowable tolerance range comprises recentering the tolerance range on the first distinguishing dimension of the first stud as measured by the first travel distance of the sensing element.

16. The method of welding according to claim 10, wherein the step of automatically adapting the first allowable tolerance range to create a second allowable tolerance range comprises recentering the first tolerance range on a calculated distinguishing dimension calculated on a sliding mean value of the travel distances of the sensing element measured during the plurality of preceding joining operations.

17. The method of claim 1, wherein the later adaptation of the allowable tolerance range excludes any measured travel distance of a rejected stud.

18. The method of claim 3, wherein the later adaptation of the allowable tolerance range excludes any measured travel distance of a rejected stud.

19. The method of welding according to claim 8, wherein the automatic adapting of the allowable tolerance range excludes any measured travel distance of a rejected stud.

20. The method of welding according to claim 9, wherein the preceding plurality of travel distances excludes any measured travel distance of a rejected stud.

* * * * *